United States Patent
Fransos et al.

[15] 3,684,337
[45] Aug. 15, 1972

[54] RETAINING CAGES FOR ROLLING ELEMENTS IN BEARINGS

[72] Inventors: Pietro Fransos, Via Saorgio 30; Domenico Camosso, Via Gorizia 149, both of Turin, Italy

[22] Filed: Dec. 18, 1970

[21] Appl. No.: 99,564

[30] Foreign Application Priority Data

Feb. 10, 1970 Italy.....................67416 A/70
May 22, 1970 Italy.....................68763 A/70

[52] U.S. Cl..............................................308/217
[51] Int. Cl...............................................F16c 33/46
[58] Field of Search.......................308/213, 214, 217

[56] References Cited

UNITED STATES PATENTS 3,014,769  12/1961  Gales.......................308/213

FOREIGN PATENTS OR APPLICATIONS 990,217    4/1965   Great Britain............308/217
1,045,100  10/1966  Great Britain............308/217
1,178,462  1/1970   Great Britain............308/217

*Primary Examiner*—Martin P. Schwadron
*Assistant Examiner*—Frank Susko
*Attorney*—Sughrue, Rothwell, Mion, Zinn & Macpeak

[57] ABSTRACT

A bearing cage is formed from a single piece of sheet metal with a number of windows adapted to retain respective rolling elements against movement in the sense of the bearing load. The cage is formed integrally with a number of pairs of wings folded towards the rolling elements so as to retain them in the respective windows in a sense opposite that of the normal bearing load, so that the rolling elements, located in the windows by spring action, are trapped therein. The construction is described for bearings of both the radially loaded and axially loaded type.

20 Claims, 28 Drawing Figures

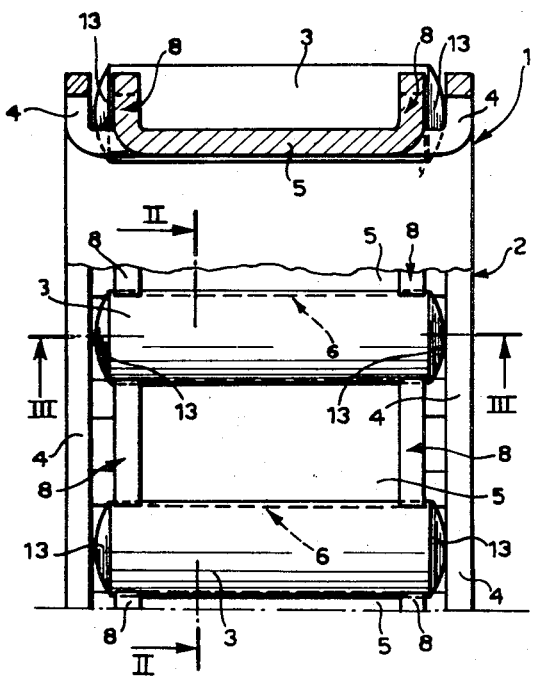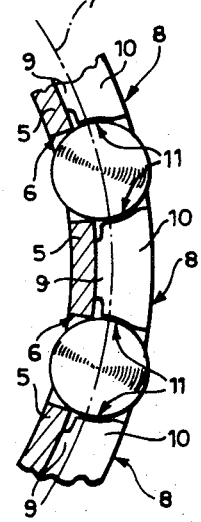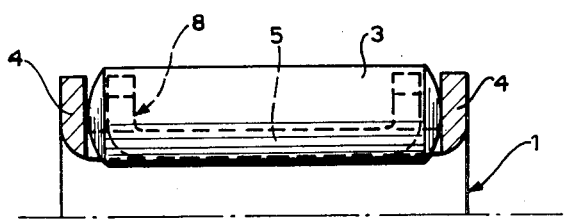

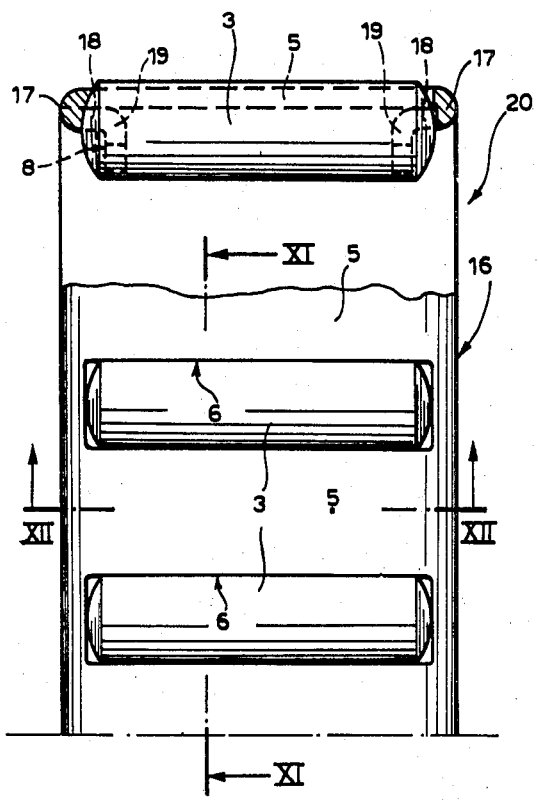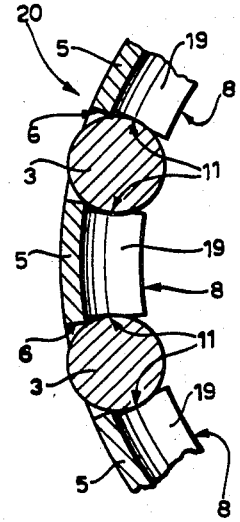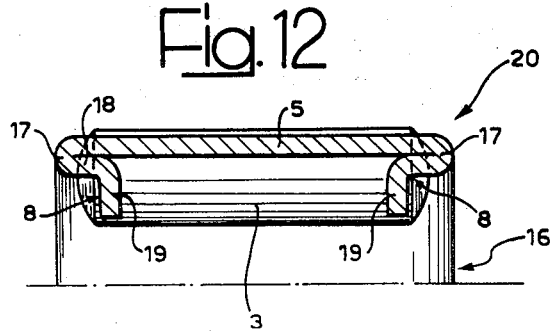

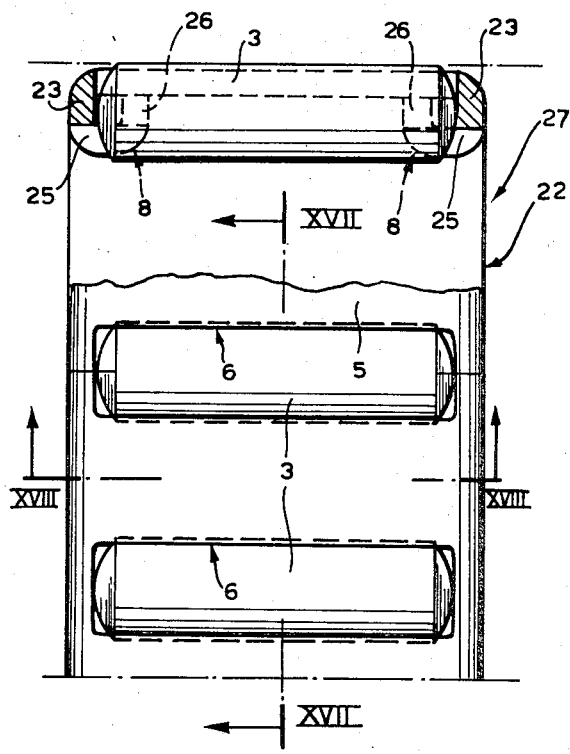
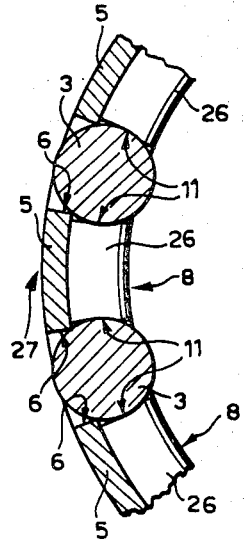
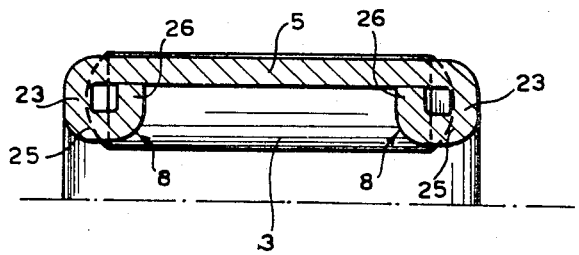

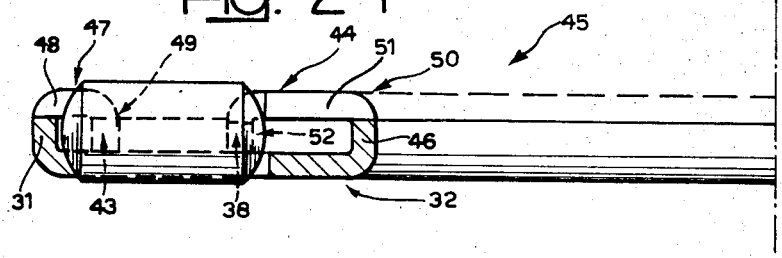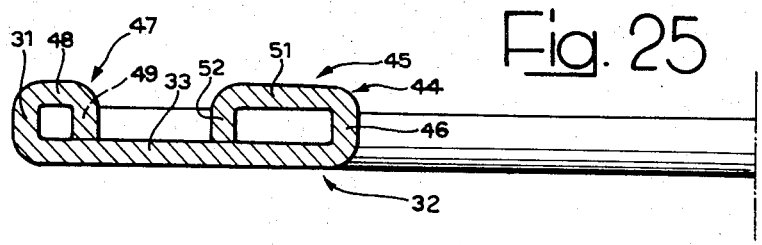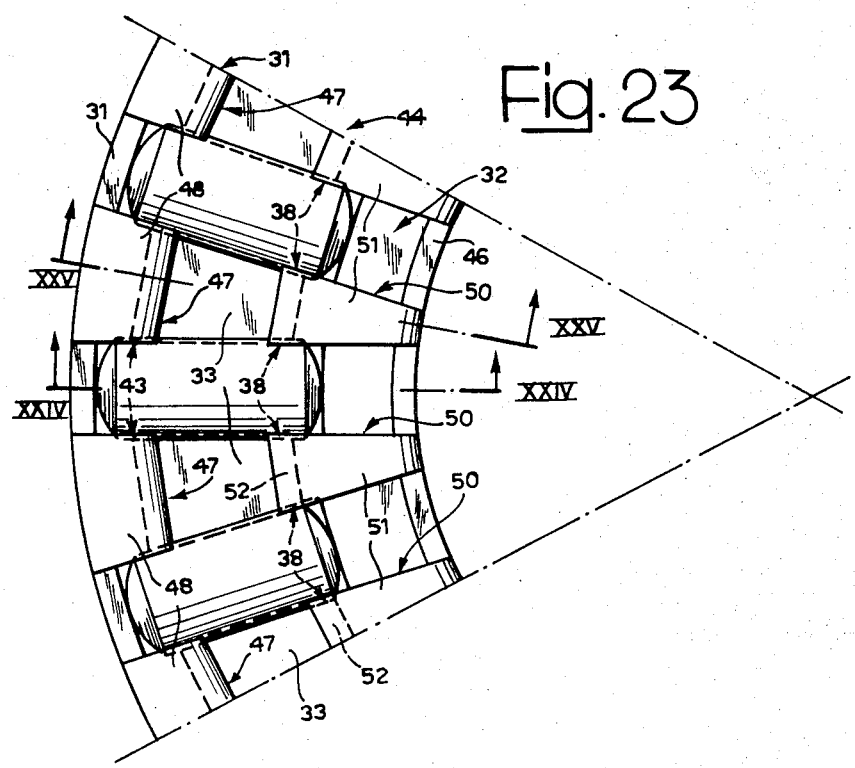

RETAINING CAGES FOR ROLLING ELEMENTS IN BEARINGS

This invention relates to retaining cages for rolling elements in bearings. The invention has particular application to bearings adapted to be interposed between relatively rotatable bodies capable of relative reciprocation.

In particular this invention refers to bearing cages of the type formed comprising a single piece of sheet metal formed with two annular bodies interconnected by a number of identical and uniformly distributed braces defining with said annular bodies a number of windows each adapted to retain a respective rolling element against movement in the direction of the normal load on the bearing.

Bearing cages as hitherto known are adapted to hold a number of rolling elements. The cages may be in direct contact with one or the other of the relatively rotatable bodies or inside two metal rings provided with the rolling elements and each able to rotate jointly with the respective relatively rotatable bodies. Such known cages are substantially divided into two categories.

The first category comprise supporting cages which are formed by two metal rings joined together by a number of braces delimiting a number of windows, each adapted to hold a rolling element, and in which the braces and the rings are formed by a single suitably machined metal body. The braces generally have a substantially quadrangular shape and are provided, in correspondence with their surfaces facing the rolling elements, with appendices adapted to retain the rolling elements in the respective windows in the cage. Such appendices are formed either by machining of the braces, or by plastic deformation thereof by rolling and smoothing of the braces.

In other known cages the whole surface of the braces facing the rolling elements is worked by metal removal so as to retain and guide the rolling elements.

The second category include cages formed by a single metal sheet in which the windows adapted to contain the rolling elements are obtained by working the sheet itself. In such cages the windows have transverse dimensions smaller than those of the rolling elements. In consequence, the braces are adapted to hold the rolling elements in at least one direction of the normal load on the bearing.

In some cases, the braces also serve the function of retaining the rolling elements against movement in an opposite direction to that of the normal load on the bearing.

Bearing cages in the aforesaid second category have a number of advantages: forming the cage from a single piece of cut and folded metal sheet results in their being less complex, lighter and, therefore, more economical to manufacture than cages made from a number of parts; such one-piece sheet metal cages are also easily mass produced.

Among the known cages formed from simple cut and folded metal sheet the best known is that described in British Pat. Specification No. 731,516 (Durkoppwerke Aktiengesellschaft). This bearing cage represents one of the best examples of sheet metal cages and is widely used, in spite of the fact that, although it represents a decisive step forward with respect to the cages obtained by the removal of metal by machining, it has various disadvantages. In fact this cage is formed by a cylindrical body provided with a flanged end and having a number of windows, each adapted to contain a rolling element, defined by braces which extend between the flanges and are integral with them.

The aforesaid braces are folded into substantially a U-shape and have flat coplanar end parts and a central part, also flat, connected to the end parts by two inclined portions.

The width of each window in correspondence with the flat central part of the respective braces is smaller than that of the rolling elements which they can contain. Besides the flat end parts and the central part are spaced from the axis of the cage at a distance which is respectively greater or smaller than the mean diameter of the cage itself, that is, the diameter of the circle on which the axes of the rolling elements lie, so as to hold the rolling elements against movement in either direction parallel to the normal direction of the load on the bearing.

The function of guiding the rolling elements during their rotation is carried out by the inclined portions, which are provided with slots of oval shape. These slots, the planes of which are inclined to the axes of the rolling elements (which usually comprise rollers), are adapted to embrace with precision part of the external surfaces of the rolling elements and to guide the rotation of the latter. Because the braces in the above mentioned cages are bent after the cutting of the windows, the accurate forming of the windows, and the calculation of their shape in inclined portions of the braces, is difficult. In the second place it will be seen that the windows are formed by cutting into the metal sheet and, as the cutting tool used will inevitably be subject to wear and tear, the profile of the windows will not be constant. Such variation of the size or shape of the windows gives rise to the possibility of the rolling elements sticking to the braces, and the resulting friction would cause immediate rapid wear of the bearing.

Where the rolling elements are formed by rollers it is necessary, for their most efficient operation, for the rollers to be guided as near as possible to their ends. In the cage described in the above-mentioned British Pat. Specification No. 731,516, the inclined portions of the braces adapted to perform the function of guiding are drawn close to one another during the folding of the braces themselves. In consequence the said inclined portions do not co-operate with the ends of the rollers, as is desirable for optimum guiding of the rollers.

An object of this invention is to provide a bearing cage formed from sheet metal, which is able to avoid or ameliorate the above-mentioned disadvantages and which has good retaining and guiding characteristics for the rolling elements, together with low weight and economy of manufacture.

Another object of this invention is to provide a cage for rolling elements which is easily mass-produced and in which the profiles of the surfaces which guide the rolling elements is not appreciably influenced by wear of the tools used to form the cage.

Finally, a further object of this invention is to provide a bearing cage having a high resistance to the loads imported thereto by the rolling elements, consistent with the thickness of the metal sheet used to make the cage.

The bearing cage according to the invention accordingly comprises a single piece of sheet metal formed with two annular bodies interconnected by a number of identical and uniformly distributed braces defining, with said annular bodies, a number of windows each adapted to retain a respective rolling element against movement in the direction of the normal load on the bearing, characterized in that the cage has a number of pairs of upstanding wings, formed in one piece with the cage at opposite ends of the braces, the said wings being adapted to contact respective rolling elements of the bearing to retain said rolling elements against movement away from the respective braces, the rolling elements being locatable by spring action in the respective windows of the cage.

Preferably the braces co-operate with the surfaces of the rolling elements on one side only of the mean surface containing the axes of rotation of the said rolling elements.

According to another preferred embodiment of the invention, each wing is folded in such a way that an end portion is disposed at right angles to the respective brace and at or adjacent one end of the latter so as to co-operate laterally with two adjacent rolling elements and to retain said elements in the respective windows of the cage. According to a further preferred embodiment of the invention, each of the rolling elements is retained and guided by opposite pairs of curved surfaces formed on the lateral edges of each said wing and adapted to co-operate, at least for a part of its circumference, with that part of the external surface of the respective rolling element opposite to that co-operating with the braces.

The invention will be more clearly understood from the following description, given by way of non-limiting example with reference to the enclosed drawings, in which:

FIG. 1 is a side elevation, partly cut away and partly in section, of a cage for radial bearings according to a first embodiment of the invention;

FIG. 2 is a section on line II—II of FIG. 1;

FIG. 3 is a section on line III—III of FIG. 1;

FIG. 10 is a side elevation, partly cut away and partly in section, of a variation of the cage illustrated in FIG. 7;

FIG. 11 is a section on line XI—XI of FIG. 10;

FIG. 12 is a section on line XII—XII of FIG. 10;

FIG. 16 is a side elevation, partly cut away and partly in section, of a variation of the cage illustrated in FIG. 13;

FIG. 17 is a section on line XVII—XVII of FIG. 16;

FIG. 18 is a section on line XVIII—XVIII of FIG. 16;

FIG. 23 is a plan view of part of a cage, similar to that illustrated in FIG. 19, for a thrust bearing;

FIG. 24 is a section on line XXIV—XXIV of FIG. 23;

FIG. 25 is a section on line XXV—XXV of FIG. 23;

Figure 4:
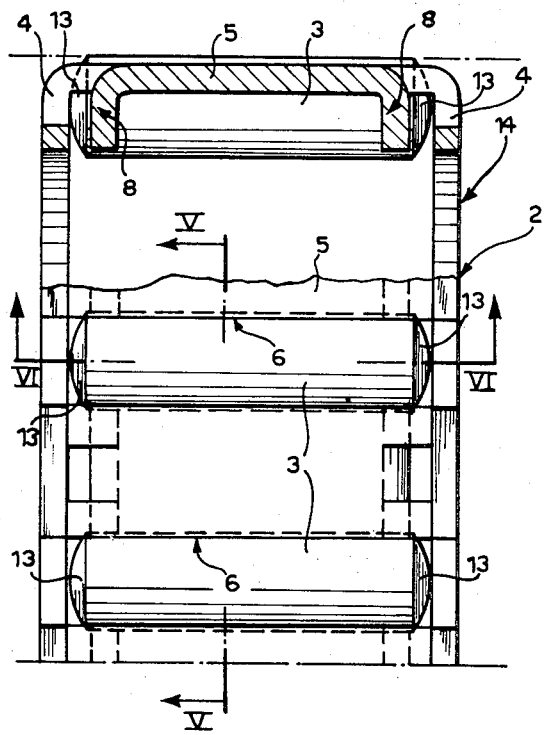
FIG. 4 is a side elevation, partly cut away and partly in section, of a variation of the cage illustrated in FIG. 1.

In FIGS. 1 and 3, a radial bearing indicated generally by 1 comprises a cage 2 supporting and retaining a number of substantially cylindrical rollers 3.

The cage 2 is substantially cylindrical in shape, and is formed from sheet metal. The cage 2 has two annular end bodies comprising flanges 4 interconnected by a number of transverse braces 5 formed in one piece with the flanges 4. The braces 5 extend perpendicularly to the flanges 4 in directions parallel to the axis of the cage 2. The braces 5, which are substantially rectangular in shape, are uniformly distributed around the cage 2 and have external surfaces which form part of a common cylinder coaxial with the cage axis.

The braces 5 are formed by cutting through a tubular member of sheet metal, so that a number of substantially rectangular windows 6 are defined between the braces 5, the windows 6 having the same length as the braces.

The cylindrical surface of the cage 2 has a diameter smaller than the cylindrical surface containing the axes of the rollers 3, the latter surface being indicated in FIG. 2 by the chain-dotted line 7, hereinafter referred to as the mean circle. The windows 6 have a width smaller than the diameter of the rollers 3.

The cage 2 is formed, in correspondence with the axial ends of the braces 5, with a number of radically outwardly projecting wings 8 obtained by cutting through and deforming the annular flanges 4 at circumferential intervals. Each wing 8 has substantially the shape of a T and lies in a plane perpendicular to the adjoining brace 5 and perpendicular to the axes of the rollers 3.

Each wing 8 has a radially inner part 9 of reduced circumferential width directly connected to the end of the respective brace 5 and a radially outer part 10 coplanar with the inner part 9 and disposed symmetrically with respect to the latter. The two ends of the outer part 10 are adapted to co-operate with the external surfaces of an adjacent pair of rollers 3. To this end, the outer parts 10 of each pair of adjacent wings 8 define between their adjoining edges a respective part-circular slot 11 coaxial with the axis of the corresponding roller 3 and having a diameter slightly larger than that of the said roller 3.

Each slot 11 intersects the mean circle 7 so as to co-operate, at least over a part of its surface, with that part of the respective roller surface 3 which lies at any given time outside the said mean circle 7.

The annular flanges 4 are disposed on the outside of the tubular body forming the cage 2 and lie on planes perpendicular to the axis of the latter. The flanges 4 are adapted to co-operate with rounded end surfaces 13 formed on the axial ends of the rollers 3.

In the bearing of FIGS. 1 to 3, the rollers 3 are held within the windows 6 against axial movement by the annular flanges 4, against radial movement inwardly by the braces 5 against radial movement outwardly by the wings 8.

As a result of the elasticity of the wings 8, the rollers 3 are held with a spring action against the edges of the respective windows 6.

Considerable advantages are possessed by the cage 2 herein described and illustrated as compared with known cages formed by folded and perforated metal sheet, in particular as compared with the cage described in United Kingdom Pat. Specification No. 731,516.

Firstly, since the braces 5 are not folded, but formed by simple cutting or stamping of the tubular body forming the cage 2 along the direction of generatrices thereof, the braces 5 are easily obtained by cutting through and do not need difficult calculations for the design of their shape. Secondly, since the braces 5 have a substantially rectangular shape, the shape and size of the braces are not influenced greatly by wear and tear on the cutting tools used to form the braces 5, minimizing the danger of rubbing between the rollers 3 and the cage 2.

Another important advantage of the cage herein described is that of simplicity of construction because the wings 8 perform the dual role of guiding the rollers 3 during their rotation and of retaining the rollers 3 in the respective windows 6.

Since the slots 11 are part-circular in shape, it follows that the slots 11 retain their circular shape even if the tool used to perforate them wears out. Also the slots 11, being of easily calculable shape reduces to a minimum the danger of rubbing between rollers 3 and the cage 2.

It will be appreciated that, by virtue of the wings 8, the rollers 3 are guided at their opposite axial ends, contrary to what happens in the previously known cages of sheet metal sheet, so that the possibility of the rollers 3 adopting a screwing motion is practically eliminated.

The wings 8, being perpendicular to the axes of the rollers 3 resist the loads imparted by the rollers 3 to the cage 2. These loads are reduced in their magnitude, to cutting loads on the wings 8 themselves.

Lubrication of bearings having cages of the type described is facilitated by the slots 11 cut into the tubular body forming the cage 2 to form the wings 8. Oil circulation in the bearing is consequently favored, with evident advantages.

A further advantage of the cage described is that of having for a given thickness of metal sheet, the smallest possible weight. In fact, since the braces 5 are straight and do not undergo deformation during the manufacture of the cage 2 from a metal tube, the overall length of the said metal tube, which is the same as that of the rollers 3 is a minimum. Moreover, in contrast to known cages, the tubular body from which the cage 2 herein described is formed has a diameter which is not only less than that of the mean circle diameter, but is a minimum.

Figure 5:
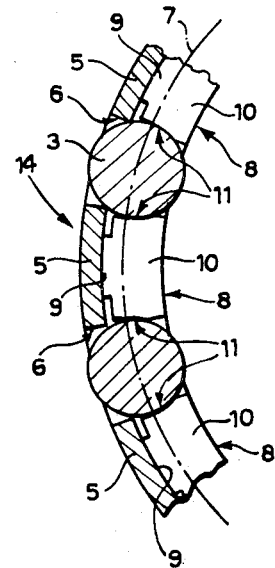
FIG. 5 is a section on line V—V of FIG. 4.
Figure 6:
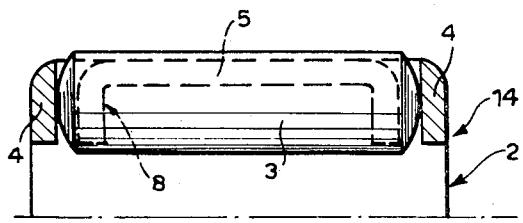
FIG. 6 is a section on line VI—VI of FIG. 4.

This last feature is not possessed by the variation of the bearing 1 illustrated in FIGS. 4 to 6.

The variation of FIGS. 4 to 6 comprises a radial bearing 14 similar to the radial bearing 1 of FIGS. 1 to 3 except for the fact that the annular flanges 4 and the wings 8 extend radially inwardly towards the center of the tubular body forming the cage 2 instead of radially outwardly. In this case the rollers 3 are retained against radial movement outwardly by the braces 5 and are retained against radial movement inwardly by the wings 8.

The tubular body forming the cage 2 of the bearing 14 is therefore of larger diameter than the mean circle of the bearing and consequently the weight of the cage thus formed is greater than that of the cage illustrated in FIGS. 1 to 3.

The cage 2 in the embodiment of FIGS. 4 to 6 is used only when a cage of particular sturdiness and rigidity is required.

Figure 7:
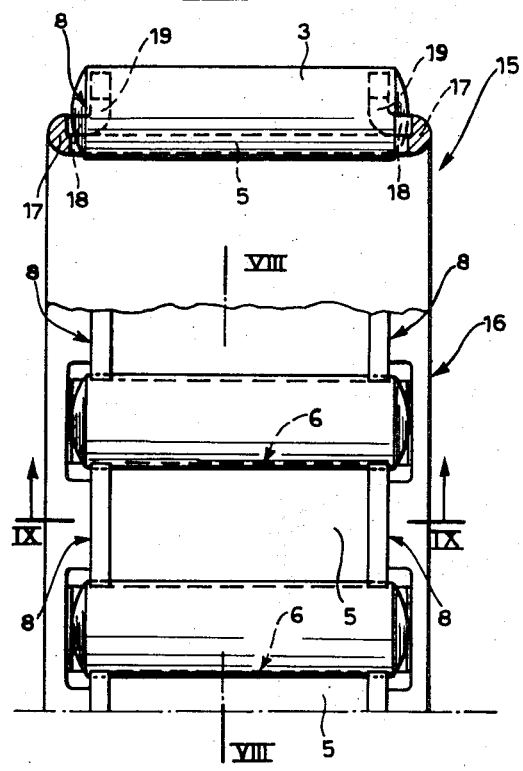
FIG. 7 is a side elevation, partly cut away and partly in section, of a further variation of the cage illustrated in FIG. 1.
Figure 8:
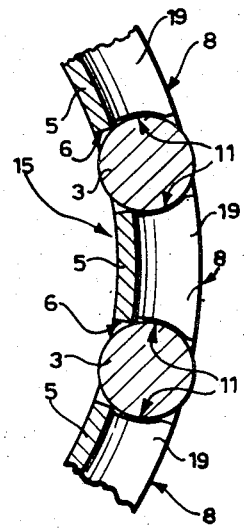
FIG. 8 is a section on line VIII—VIII of FIG. 7.
Figure 9:
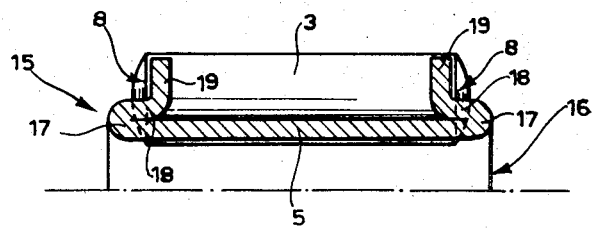
FIG. 9 is a section on line IX—IX of FIG. 7.

FIGS. 7 to 9 illustrate a radial bearing 15 which is basically similar to the radial bearing 1 of FIGS. 1 to 3.

In the bearing 15 the rollers 3 are supported by a cage 16, which comprises two annular flanges 17 connected to the ends of the braces 5 and formed integrally therewith. The cage 16 has radially outwardly projecting wings 8 integral with the annular flanges 17 and in correspondence with the axial ends of the braces 5.

The annular flanges 17 are formed by folding of the axial ends of the tubular body forming the cage 16 outwardly upon themselves to provide at each end a first portion 18 of small axial extension parallel to the respective brace 5 and in contact therewith, and an upstanding second portion 19 perpendicular to the respective brace 5 and forming the respective wing 8. Each portion 19 increases in circumferential width in a radially outward direction, having part-circular opposite side edges defining respective slots 11 in which the rollers 3 are located, the pairs of edges defining each slot 11 having common centers lying on the mean circle of the bearing 15.

In this case, as in the embodiment of FIGS. 1 to 3, the wings 8 hold the rollers 3 in the respective windows 6 against radial movement in one sense, according to the direction of the radial load of the bearing, while radial loads in the opposite sense are transmitted from the rollers 3 to the braces 5. In the embodiment of FIGS. 7 to 9 the wings 8 project radially outwardly and retain the rollers against radially outward movement.

FIGS. 10 to 12 show a radial bearing 20 in which the wings 8 are folded over radially inwardly to retain the rollers 3 against radially inward movement, the bearing 20 being similar in other respects to the bearing 15.

Figure 13:
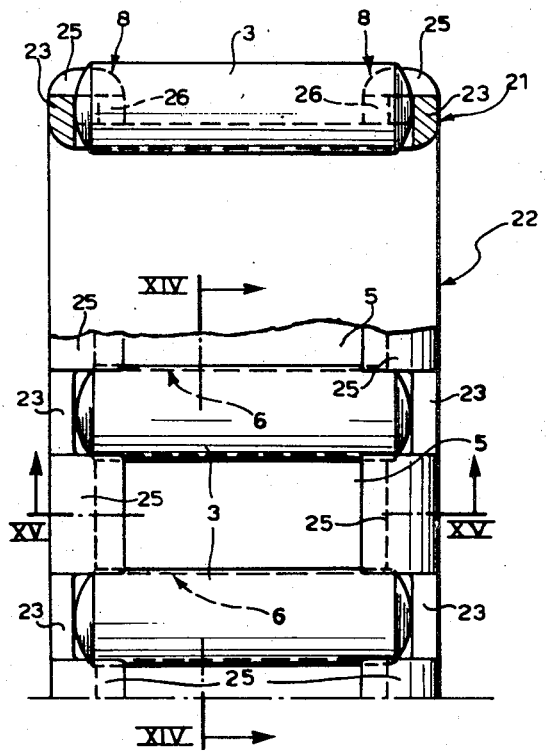
FIG. 13 is a side elevation, partly cut away and partly in section, of a cage according to a further embodiment of the invention, similar to that illustrated in FIGS. 1 and 7.
Figure 14:
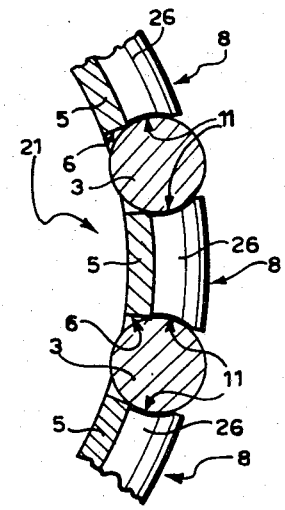
FIG. 14 is a section on line XIV—XIV of FIG. 13.
Figure 15:
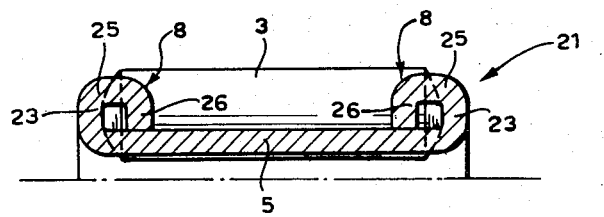
FIG. 15 is a section on line XV—XV of FIG. 13.
Figure 20:
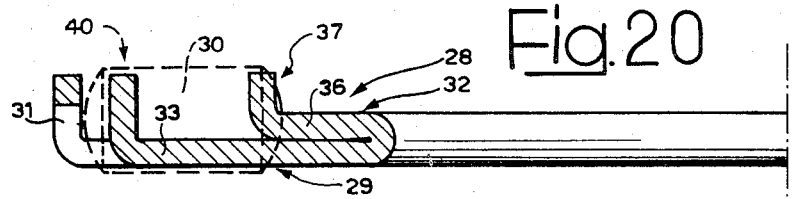
FIG. 20 is a section on line XX—XX of FIG. 19.
Figure 21:
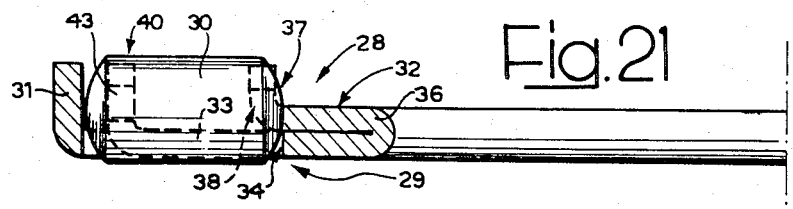
FIG. 21 is a section on line XXI—XXI of FIG. 19.
Figure 19:
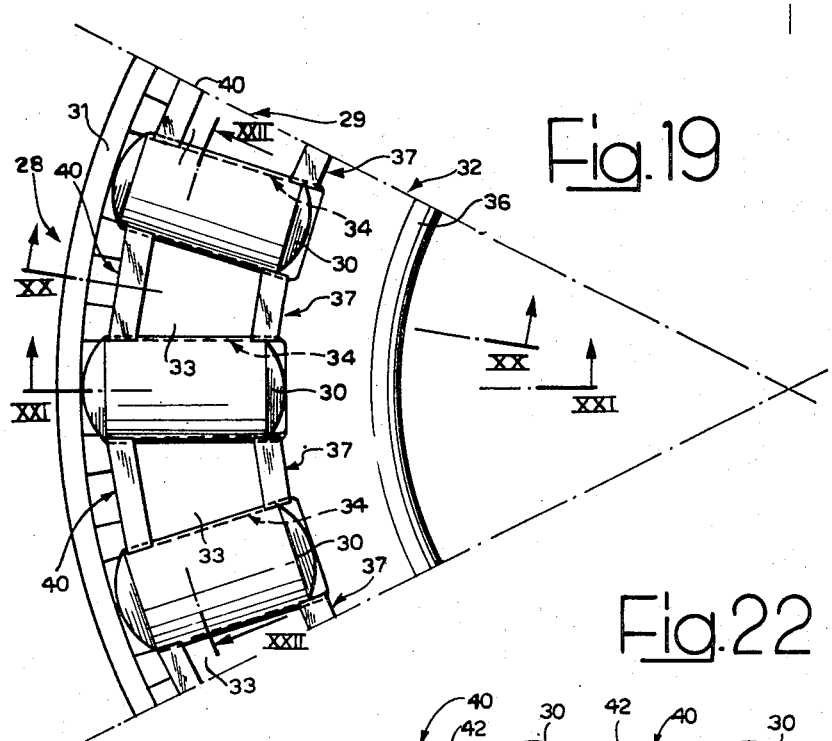
FIG. 19 is a plan view of part of a cage for a thrust bearing according to another embodiment of the invention.

In the embodiment illustrated in FIGS. 13 to 15 a radial bearing indicated generally by 21 has a number of rollers 3 supported by a cage 22 formed from a substantially tubular body. The cage 22 has two annular end flanges 23 formed integrally with and located at opposite axial ends of respective transverse braces 5. The flanges 23 project radially outwardly, perpendicular to the braces 5.

The rollers 3 are retained against radially outward movement by wings 8 formed by integral extensions of the annular flanges 23. Each flange 23 is bent over on the outside surface of the cage 22 and towards the center of the cage 22 to form a first portion 25 parallel to and radially outwardly of the braces 5 at opposite ends thereof and a second radially inwardly projecting portion 26 perpendicular to the portion 25 and abutting the outer surface of the respective brace 5. The portions 26 form the wings 8 and have lateral curved edges which define respective slots 11 and which co-operate with the external surfaces of adjacent pairs of rollers 3.

In this embodiment also the slots 11 intersect the mean circle of the bearing 21 and have a guiding and retaining action on the roller 3.

The embodiment illustrated in FIGS. 16 to 18 is a radial bearing 27 similar in many respects to the radial bearing 21 of FIGS. 13 to 15 except for the fact that the annular flanges 23 are bent over on the inside surface of the tubular body forming the cage 22 and towards the center of the cage. The wings 8 project radially inwardly, and are formed in a manner similar to the wings 8 in FIGS. 13 to 15, integrally with the flanges 23.

FIGS. 19 to 22 illustrate a thrust bearing 28 including a cage 29 of sheet metal adapted to support a number of rollers 30 and provided with means for retaining and guiding the rollers 30, similar in general to those illustrated in FIGS. 1 to 18.

The cage 29 is formed by an annular plate of sheet metal comprising an outer annular portion 31 and an inner annular portion 32, concentric with the outer portion 31 and connected thereto by a number of radial braces 33 lying in the plane of the plate forming the cage 29. The braces 23 are evenly distributed circumferentially and have equal dimensions, each having in plan a substantially trapezoidal shape. Windows 34, of substantially rectangular shape, are defined between the braces 33, the windows 34 housing respective rollers 30.

The outer annular portion 31 is perpendicular to the plane of the plate forming the cage 29, while the inner portion 32 is folded on itself so as to form a continuous rounded lip 36, the folded portion 32 being parallel to the remainder of the plate forming the cage 29.

The free edge of the folded-over portion 32 in correspondence with the axial ends of the braces 33 is bent upwardly at right angles, in the same direction as the portion 31 to form a number of inner upstanding wings 37 perpendicular to the plane of the plate forming the cage 29.

The wings 37 are substantially rectangular in shape and define with their lateral, circumferentially facing, edges respective slots 43 which co-operate with the lateral surfaces of the rollers 30.

Figure 22:
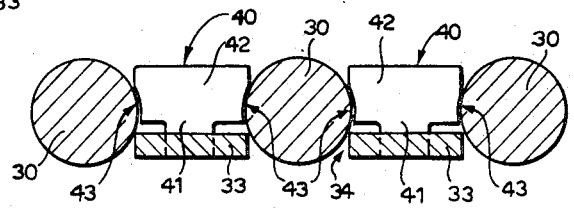
FIG. 22 is a section on line XXII—XXII of FIG. 19.

If one defines as the mean plane of the thrust bearing 28 that plane parallel to the plate forming the cage 29 which passes through the axes of the rollers 30, then the slots 38 are disposed, as viewed in FIG. 22, above said mean plane and extend at least for a certain distance to the opposite side of said mean plane with respect to the braces 33.

A number of outer upstanding wings 40 are formed, in correspondence with the radially outer ends of the braces 33, by cutting through the metal sheet from which the cage 29 is formed. Each wing 40 has substantially the shape of a T (FIG. 22) and is folded upwardly so as to be perpendicular to the plane of the plate forming the cage 29, and on the same side thereof as the inner wings 37.

Each wing 40 comprises an inner portion 41 and a coplanar integral outer portion 42, the inner portion 41 being of narrower width than the outer portion and being integrally connected to the radially outer end of the respective brace 33. Each outer portion 42 has part-circular circumferentially facing side edges defining two adjoining slots 43 which are adapted to co-operate with the external surfaces of the respective rollers 30 at the radially outer axial ends of the latter.

The slots 43, like the slots 38, extend across the mean plane of the bearing 28 and are adapted to guide and retain the rollers 30.

In the thrust bearing 28 of FIGS. 19 to 22 the rollers 30 are held against movement in the direction of the load, which in this case is perpendicular to the plane of the plate forming the cage 29, by the braces 33 on one side of the mean plane and by the wings 37 and 40 on the other side of the mean plane.

It will be appreciated that mode of operation and the advantages given by the thrust bearing 28 are similar to those of the radial bearings illustrated in FIGS. 1 to 18.

Another form of thrust bearing in accordance with the invention is illustrated in FIGS. 23 to 25 by the reference numeral 45. The bearing 45 has a cage 44 of sheet metal. The cage 44 has an upstanding outer annular portion 31 perpendicular to the plane of the cage and an inner portion 32 which is bent at right angles to form an inner annular lip 46 parallel to, and on the same side as the outer portion 31. Respective outer wings 47, integral with the outer portion 31, and each substantially trapezoidal in shape, are formed in correspondence with respective radial braces 33 interconnecting the outer and inner portions 31 and 32, the larger side of each trapezoidal wing 47 adjoining the outer portion 31.

Each outer wing 47, obtained by cutting through the metal sheet, has a first portion 48 parallel to the plane of the plate forming the cage 44 and a second end portion 49 perpendicular to the said plane and abutting, at its free end, the surface of the corresponding brace 33 in a point near the radially outer end of the latter. The portions 49 of the wing 47 define between their adjoining edges respective part-circular slots 43 in which the respective rollers are located.

Respective inner wings 50, each substantially trapezoidal in shape, are formed integrally with the radially inner portion 32 in correspondence with the inner ends of the braces 33. Each wing 50 adjoins the inner portion 32 along its smaller edge. Each inner wing 50 has a first portion 51 folded above the inner portion 32 and parallel to the plane of the plate forming the cage 44 and a second portion 52 folded perpendicularly to the said plane and abutting at its free end the surface of the corresponding brace 33 near the inner radial end of the latter. The adjoining side edges of the wings 50 define part-circular slots 58 which are radially aligned with the slots 43.

As in the case of the cage 29 of FIGS. 19 to 22 in the cage 44 the slots 38 and 43 extend across the mean plane of the bearing.

In this way, the wings 47 and 50 retain the rollers 30 in their respective windows 34 and guide them in their rotating motion.

Figure 26:
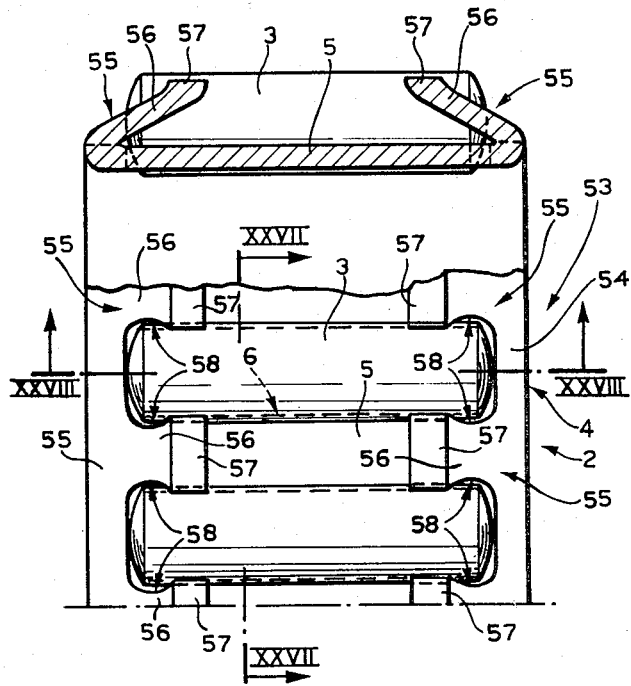
FIG. 26 is a side elevation, partly cut away and partly in section, of a cage according to yet another embodiment of the invention.
Figure 27:
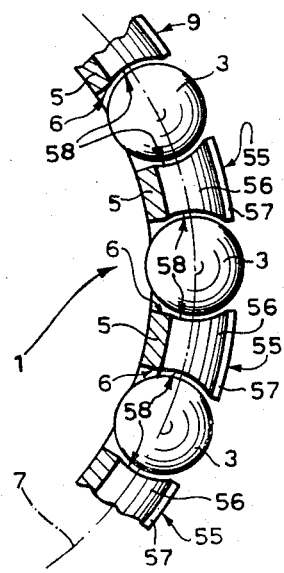
FIG. 27 is a section on line XXVII—XXVII of FIG. 26.
Figure 28:
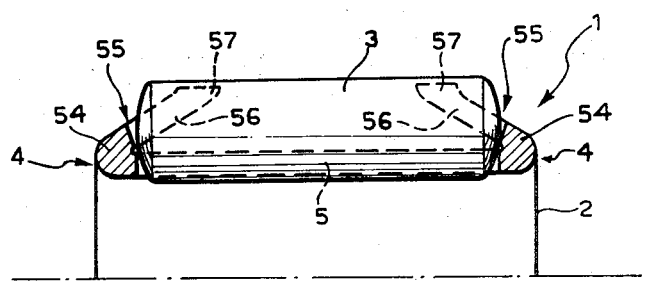
FIG. 28 is a section on line XXVIII—XXVIII of FIG. 26.

FIGS. 26 to 28 illustrate a radial bearing 53 which is similar to those illustrated in FIGS. 1 to 18.

The bearing 53 has a cage 2 provided with outwardly projecting end flanges 4. Each flange 4 is folded over so as to form each a continuous annular frusto-conical lip 54 the external diameter of which tapers towards the corresponding axial end of the cage 2. The flanges 4 are interconnected by a number of axially extending integrally formed braces 5.

The cage 2 is formed in correspondence with the axial ends of the braces 5, with wings 55 obtained by slitting the lips 54 of the annular flanges 4. The wings 55 converge towards each other outside the respective braces 5, each wing 55 including a portion 56 parallel to a generator of the corresponding lip 54 and integrally connected to the latter, and an end portion 57 folded outwardly and lying in a plane perpendicular to the axis of the cage 2.

The wings 55 define, between the side edges of their portions 56, a number of part-elliptical slots 58, each of which crosses the mean circle 7 of the cage 2. The said side edges co-operate each with the surface of one of the rollers 3 of the bearing 53, so that the rollers 3 are retained and guided for rotation parallel to the axis of the cage 2.

Because of the position and the dimensions of each wing 55, the slots 58 embrace the respective rollers 3 very near to the axial ends of the latter.

In the cage shown in FIGS. 26 to 28 the rollers 3 are held in the windows 6 against radially inward movement by the braces 5 and against radially outward movement by the wings 55, the latter being adapted to co-operate with the rollers 3 in correspondence with the outside ends of the slots 58. The end portion 57 of each wing 54 performs the task of reinforcing the outer ends of the wings 54 at the radially outer ends of the slots 58.

In all the bearings herein described the rotating bodies comprise rollers. It is, however, possible to manufacture radial or thrust bearings according to this invention with rotating bodies of different shapes, that is, bodies having straight or curved generators.

It will be understood that details of manufacture of the bearing cage according to the invention can be varied widely from what has been herein described and illustrated by way of example, without departing from the scope of the invention.

What is claimed is:

1. A bearing cage comprising a single piece of sheet metal with two generally annular end bodies interconnected by a number of identical and uniformly distributed braces, adjacent pairs of said braces defining a series of windows each adapted to hold a rolling element, and including a number of wings upstanding from the braces, one such wing being located at each end of each brace, each of said wings being disposed in spaced apart upstanding relation relative to the surface of said braces and extending transversely between adjacent windows intermediate the ends thereof, the pair of adjacent braces defining the window that holds each rolling element contacting that element on one side of the mean surface containing the axis of rotation of the rolling elements to restrain the element from movement through the window; the element also contacting on the other side of such means surface, at each of the ends of the rolling element, a pair of adjacent wings, such contact between the rolling element and the wings restraining the rolling element from movement away from the window, the braces extending throughout their length in a direction parallel to the mean surface containing the axes of rotation of the rolling elements.

2. A bearing cage according to claim 1, in which each wing co-operates laterally with two adjacent said rolling elements to retain said elements in respective said windows.

3. A bearing cage according to claim 1, in which the cage comprises a cylindrical sheet metal tubular member having two annular flanges at its axial ends, with the braces extending parallel to the cylinder axis between said flanges.

4. A bearing cage according to claim 3 in which the tubular member has a diameter which is smaller than that of the mean cylinder containing the axes of rotation of the rolling elements.

5. A bearing cage according to claim 3, in which the tubular member has a diameter which is greater than that of the mean cylinder containing the axes of rotation of the rolling elements.

6. A bearing cage according to claim 3, in which the annular flanges are perpendicular to the axis of the cage and are adapted to support the rolling elements against axial movement.

7. A bearing cage according to claim 6, in which the annular flanges project radially outwardly and the wings are formed by cutting through the flanges, the said wings extending radially outwardly and having substantially the shape of a T with a circumferentially extending outer portion, and each wing having lateral surfaces for retaining and guiding the rolling elements.

8. A bearing cage according to claim 6, in which the annular flanges project radially inwardly and the wings are formed by cutting through the flanges, the said wings extending radially inwardly and having substantially the shape of a T with a circumferentially extending inner portion, and each wing having lateral surfaces for retaining and guiding the rolling elements.

9. A bearing cage according to claim 6, in which the wings project radially outwardly from the tubular member, each wing having an inner portion connected to the respective annular flange and lying parallel to the braces between which it extends and in contact with the radially external surface of such braces and an outer portion perpendicular to the respective brace and provided with lateral surfaces for retaining and guiding the rolling elements.

10. A bearing cage according to claim 5, in which the wings project radially inwardly from the tubular member, each wing having a first portion connected to the respective annular flange and lying parallel to the braces between which it extends and in contact with the radially internal surface of the latter, and a second portion disposed perpendicular to the respective brace and provided with lateral surfaces for retaining and guiding the rolling elements.

11. A bearing cage according to claim 6, in which the wings are formed integrally with the said annular flanges and project radially outwardly, each wing having one portion disposed parallel to the cylindrical surface of the tubular member and another portion perpendicular to the said cylindrical surface, said other portion of each wing having a free end abutting the radially external surface of the braces between which that wing extends.

12. A bearing cage according to claim 5, in which the wings are formed integrally with the annular flanges and project radially inwardly, each wing having one portion disposed parallel to the cylindrical surface of the tubular member and another portion perpendicular to the said cylindrical surface, said other portion of each wing having a free end abutting the radially internal surface of the braces between which that wing extends.

13. A bearing cage according to claim 1 in which the piece of sheet metal is formed into a generally annular plate having two annular portions forming circular concentric walls between which the braces extend radially.

14. A bearing cage according to claim 13, in which the annular plate has, at its radially outside edge a continuous annular upstanding wall perpendicular to the plane of the plate and, in correspondence with its inside edge, a continuous annular inner portion folded on itself so as to form an annular lip.

15. A bearing cage according to claim 14, including a series of radially inner wings extending upstandingly from the annular inner portion, each said wing being perpendicular to the annular plate and on the same side thereof as the outer annular wall, and each wing having lateral surfaces for retaining and guiding respective said rolling elements.

16. A bearing cage according to claim 14, including a series of radially outer upstanding wings, formed by cutting through the annular outer wall, connected to the annular plate at the radially outer ends of the braces and disposed perpendicular to the plane of the plate, each said outer wing having substantially the shape of a T, and having lateral surfaces adapted to retain and guide respective said rolling elements.

17. A bearing cage according to claim 13, in which the concentric walls are perpendicular to the plane of the plate.

18. A bearing cage according to claim 17, including radially outer and inner wings, said wings each having a one portion parallel to and spaced from the said plate and another portion perpendicular to the plane of the plate, the said other portion of at least the radially outer wing having a free end abutting one face of the said plate and having lateral surfaces adapted to retain and guide an adjacent pair of rolling elements.

19. A bearing cage according to claim 3, in which the wings project from the annular flanges of the cage and include substantially straight portions which slope obliquely to the cage axis and converge towards each other radially outwardly of the cage and which each have, on their lateral edges, part-elliptical surfaces which on which the axes of the rolling elements lie, said lateral co-operate with the surfaces of the rolling elements so as to guide the latter in their rotation parallel to the axis of the cage, and to retain the elements axially in the cage.

20. A bearing cage according to claim 19, in which each wing has, at its free end, a folded portion which projects radially outwardly towards and perpendicularly to the axis of the cage, the slots on the lateral edge surfaces of each wing being contained between the end of the wing connected to the respective annular flange and the inner end of the said folded portion.

* * * * *

UNITED STATES PATENT OFFICE
CERTIFICATE OF CORRECTION

Patent No. 3,684,337         Dated August 15, 1972

Inventor(s) Pietro Fransos et al

It is certified that error appears in the above-identified patent and that said Letters Patent are hereby corrected as shown below:

In The Heading:

The name of the Assignee was omitted. Should Read:

--Assignee: RIV-SKF Officine Di Villar Perosa S.p.A.,

Turin, Italy--

Signed and sealed this 20th day of February 1973.

(SEAL)
Attest:

EDWARD M. FLETCHER, JR.
Attesting Officer

ROBERT GOTTSCHALK
Commissioner of Patents